United States Patent [19]

Suzawa

[11] Patent Number: 4,487,481
[45] Date of Patent: Dec. 11, 1984

[54] BACKLIGHTED LIQUID CRYSTAL DISPLAY

[75] Inventor: Osamu Suzawa, Shiojiri, Japan

[73] Assignee: Epson Corporation, Tokyo, Japan

[21] Appl. No.: 245,856

[22] Filed: Mar. 20, 1981

[30] Foreign Application Priority Data

| Mar. 24, 1980 | [JP] | Japan | 55-38295[U] |
| Jun. 5, 1980 | [JP] | Japan | 55-75831 |
| Jun. 26, 1980 | [JP] | Japan | 55-87056 |

[51] Int. Cl.$^3$ ............................................. G02F 1/13
[52] U.S. Cl. ............................................. 350/345; 350/338
[58] Field of Search ............... 350/339 F, 345, 331 T; 315/309

[56] References Cited

U.S. PATENT DOCUMENTS

| 3,840,695 | 10/1974 | Fischer | 350/345 X |
| 3,864,905 | 2/1975 | Richardson | 350/345 X |
| 3,957,351 | 5/1977 | Stockwell | 350/345 |
| 3,994,564 | 11/1976 | Somogyi | 350/345 |
| 4,017,155 | 4/1977 | Yagi et al. | 350/345 |
| 4,043,636 | 8/1977 | Eberhardt et al. | |
| 4,043,639 | 8/1977 | Matsuyama et al. | 350/339 F X |
| 4,162,430 | 7/1979 | Cadoff et al. | 315/309 |
| 4,183,628 | 1/1980 | Laesser et al. | |
| 4,196,581 | 4/1980 | Nemoto | |
| 4,227,777 | 10/1980 | Murakami | 350/339 F X |
| 4,386,826 | 6/1983 | Stolov | 350/345 |

FOREIGN PATENT DOCUMENTS

90798 8/1978 Japan .................................. 350/345

Primary Examiner—John K. Corbin
Assistant Examiner—Richard Gallivan
Attorney, Agent, or Firm—Blum Kaplan Friedman Silberman & Beran

[57] ABSTRACT

A liquid crystal display panel having a backlight for providing high brightness, uniformity of illumination intensity, small thickness, high efficiency and which can be manufactured at a low cost. The display device includes a liquid crystal display panel, a light source for illuminating the liquid crystal panel, a light passage member which can be formed of either transparent or translucent material disposed between the liquid crystal panel and the light source. The light source inlet side of the light passage member is formed with a recess so that the thickness is reduced at the region opposed to the brightest region of the light source. A light reflecting member substantially surrounds the light source and the light passage member is formed with an opening facing the liquid crystal panel to expose a surface portion of the light passage member. The light source can either be incandescent light bulb or a cold-cathode discharge tube. In the latter case, a thermistor is coupled in series with the tube to stabilize its temperature and hence stabilize the illumination intensity against changes in ambient temperature.

11 Claims, 40 Drawing Figures

FIG.5
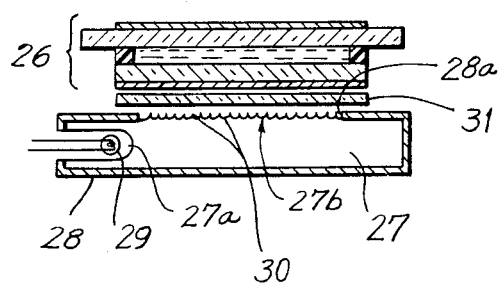
FIG.6
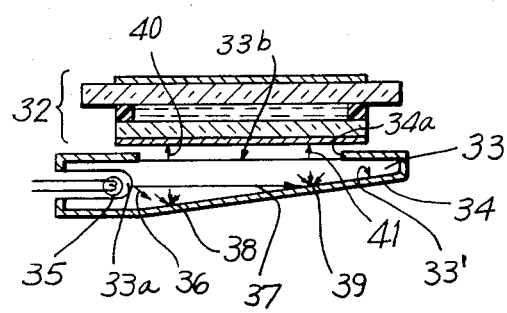
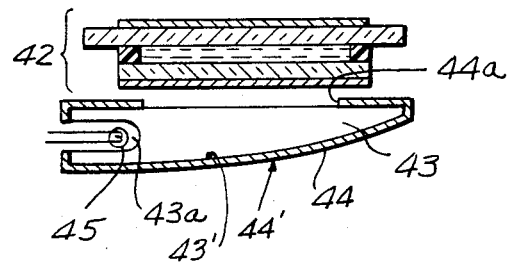
FIG.7

FIG. 29
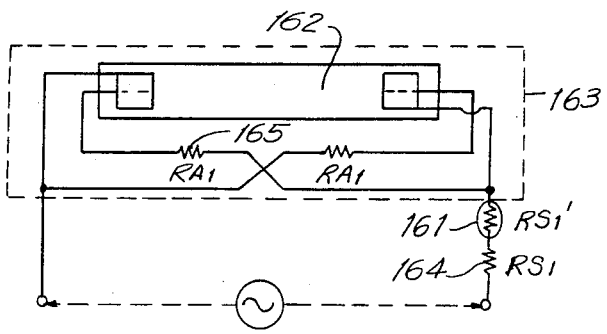
FIG. 30
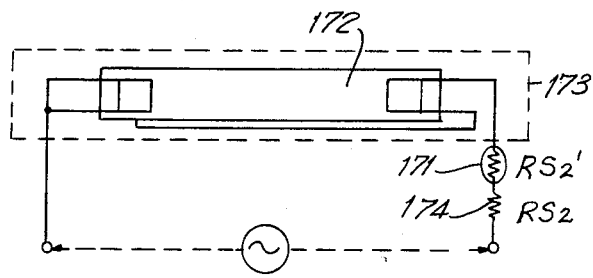
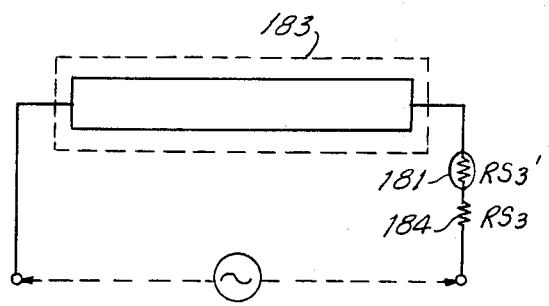
FIG. 31

BACKLIGHTED LIQUID CRYSTAL DISPLAY

BACKGROUND OF THE INVENTION

The present invention relates to a liquid crystal display device including an illumination unit.

Recently, as the characteristics of liquid crystal display devices have been improved, the range of application of liquid crystal display devices has increased. When liquid crystal display devices are used in toys, clocks, clerical machines, terminal units, automobiles, etc., it is necessary to provide an illumination device which is operable for long periods of time, which has a relatively large panel area, and which is decorative and efficient.

A liquid crystal display device having a backlight unit with a small lamp has been employed for wristwatches. The backlight for such a wristwatch display is used to illuminate the face of the watch to make it possible to read the time at night. Conventional types of backlights for liquid crystal display devices are not fully satisfactory in brightness, illumination intensity uniformity and decorative effect. Accordingly, it would be desirable to provide a liquid crystal display device with a backlight which satisfies the above-described requirements, is thin, highly efficient and can be manufactured at a low cost.

SUMMARY OF THE INVENTION

A liquid crystal display device including a liquid crystal panel, a light source for illuminating the liquid crystal panel, a light passage member made of one of transparent and translucent material with the light passage member being disposed between the liquid crystal panel and the light source, and a light reflecting member substantially surrounding the light source and the light passage member with the light reflecting member having an opening facing the liquid crystal panel to expose a surface portion of the light passage member is provided. A pluarlity of recesses can be formed on the exposed surface portion of the light passage member to scatter light passing therethrough or a plurality of beads of plastic or glass may be disposed on the exposed surface portion of the light passage member to scatter light passing therethrough. In one embodiment, the length of the light path between the light source and the exposed surface portion is uniform throughout the light passage member.

A light scattering member may also be disposed between the liquid crystal panel and the light passage member. The reflecting member can be a base member of a material such as stainless steel and silver coated with a material selected from the group of aluminum, nickel and silver. The light passage member can be made of a transparent plastic resin and the reflecting member can be a metal plate, a metal film or a laminated sheet of aluminum and plastic adhered to the surface portions of the light passage member other than the opening provided therein.

The light source may be an elongated or linear light source and the light passage member may have a space in a light inlet side thereof in which the linear light source is disposed. Alternatively, a linear light source may be disposed in a lower central portion of the display device overlapping with the display panel in plan view and a light scattering member disposed between the display panel and the linear light source. In this case, the thickness of the light scattering member is preferably gradually reduced towards the end portions thereof in the direction of the length of the light source. In one embodiment, the light scattering member is made of milky colored polycarbonate resin or milky colored acrylic resin. The thickness of the light scattering member can be reduced gradually towards the end portions thereof in a direction orthogonal to the length of the light source. The linear light source in a preferred embodiment is a cold-cathode discharge tube. In other embodiments, the reflecting member may be a metal plate of the material selected from Ag, Fe and stainless steel or may be a metal plate coated with one of Al, Ni and Ag.

A wavelength selection filter may be disposed between the liquid crystal panel and the light source. Preferably, the filter is a sharp-cut filter which blocks ultraviolet rays. The cold-cathode discharge tube can be mounted so as to be biased towards a base plate disposed on one side of the light passage member. There is further preferably included a discharge stabilizing resistor disposed outside the base plate and the light scattering and reflecting member and positioned between the base plate and the discharge tube. The liquid crystal panel can be a colored liquid crystal panel and may include a dichromatic filter. A temperature detector may be disposed near a wall of the cold-cathode discharge tube with the temperature detector coupled to a circuit for controlling a discharge voltage of the tube. The temperature detector may include a thermistor connected in series with the discharge tube.

The light source may be an incandescent light bulb with a wave length selection filter disposed between a liquid crystal layer of the liquid crystal panel and the bulb. This filter preferably blocks red light while passing blue light. The wavelength selection filter may be in the form of a cup covering the bulb.

Accordingly, it is an object of the invention to provide an improved liquid crystal display device.

It is a further object of the invention to provide an improved liquid crystal display device including a backlighting unit.

It is another object of the invention to provide a liquid crystal display device with an improved backlight unit for providing uniform illumination intensity.

Still a further object of the invention to provide an improved backlight unit including a cold-cathode discharge tube for a thermistor in series for stabilizing the temperature for providing uniform illumination to the display.

Still another object of the invention is to provide an improved backlight unit for a liquid crystal display device utilizing an elongated cold-cathode discharge tube which includes a light scattering member adapted to provide uniform illumination to the display.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 5 is a cross-sectional view of a fifth embodiment of a liquid crystal display device constructed in accordance with the present invention;

FIG. 6 is a cross-sectional view of a sixth embodiment of a liquid crystal display device constructed in accordance with the present invention;

FIG. 7 is a cross-sectional view of a seventh embodiment of a liquid crystal display device constructed in accordance with the present invention;

FIG. 29 is a circuit diagram of a temperature-compensated circuit for operating a cold-cathode discharge tube in a display device of the invention;

FIG. 30 is a second circuit diagram of a temperature-compensated circuit for operating a cold-cathode discharge tube in a display device of the invention;

FIG. 31 is a third circuit diagram of a temperature-compensated circuit for operating a cold-cathode discharge tube in a display device of the invention;

DESCRIPTION OF THE PREFERRED EMBODIMENTS

Figure 1:
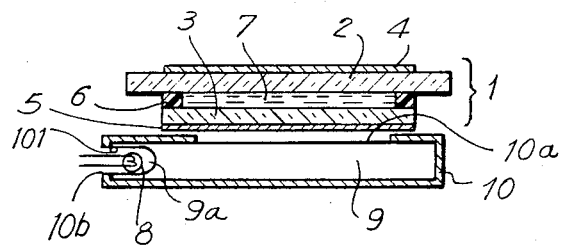
FIG. 1 is a cross-sectional view of a first embodiment of a liquid crystal display device constructed in accordance with the present invention.

A first embodiment of a liquid crystal display device including an illuminating backlight constructed and arranged in accordance with the invention is shown in FIG. 1. The device includes a liquid crystal panel 1 which is made up of an upper electrode substrate 2, a lower electrode substrate 3, a liquid crystal 7, a spacer 6, an upper polarizing element 4 and a lower polarizing element 5. Disposed behind panel 1 is a light emitting element 8 which is inserted into an opening 9a formed in a photoconductor 9. Photoconductor 9 is covered by a light scattering and reflecting element 10, except for a window 10a exposing a part of photo-conductor 9 through which light is applied to liquid crystal panel 1 and aperture 10b through which electrical connecting components, such as lead wires and the base of a socket for supplying current to the light emitting element 8 pass.

Photoconductor 9 may be made of any transparent material, but is preferably glass or an acryl material. Both glass and acryl absorb very little light energy as the light passes through and are free from double refraction. A glass plate has excellent transparency. On the other hand, an acrylic plate is advantageous in that it can be readily machined, it can be shaped as desired by molding, and it can easily be manufactured on a large scale. Additionally, an acrylic plate has the greatest transparency among plastic plates.

Light emitting element 8 may be an incandescent light bulb, a cold-cathode discharge tube or a small lamp using a tungsten filament all of which are commercially available. In this connection, a variety of small lamps, high power small lamps and low power small lamps are currently available from a number of manufacturers at relatively low cost. When light emitting element 8 is a small lamp, it must be thin and is preferably of low price. If a cold-cathode discharge tube is used as light emitting element 8, various benefits over an incandescent lamp are obtained. Specifically, a cold-cathode discharge tube emits white light, has a long service life, typically several ten thousands of hours, and has a low power consumption.

Light scattering and reflecting element 10 can be an aluminum plate, aluminum foil, an aluminum and plastic lamination sheet, a metal plate coated with Al or Ni, or an aluminum reflecting plate with glass beads. Light scattering and reflecting element 10 is bonded to photoconductor 9 or mechanically mounted thereon by mechanical pressure. Alterntively, light scattering and reflecting element 10 can be formed by the formation of a layer of aluminum or nickel on photoconductor 9 by vacuum-evaporating, sputtering, or by coating photoconductor 9 with a mixture of aluminum or nickel in an adhesive or paint. It is necessary that light scattering and reflecting element 10 be so designed that light emitted from light emitting element 8 is completely enclosed within photoconductor 9. To prevent light from leaking to the outside, it is necessary to cover light scattering element 10 with a white paint layer, aluminum plate or aluminum foil, so that light scattering and reflecting element 10 can completely enclose the light in photoconductor 9.

The emitting portion of light emitting element 8 is inserted into an opening 9a formed in photoconductor 9 with photoconductor 9 being covered by light scattering and reflecting element 10, except for window 10a through which light is applied to the liquid crystal panel 1. Thus, the light from light emitting element 8 is scattered and is enclosed in photoconductor 9 by light scattering and reflecting element 10 so as to illuminate liquid crystal panel 1 evenly through window 10a of light scattering and reflecting element 10.

When photoconductor 9 and light scattering and reflecting element 10 are constructed as described above, little light energy is absorbed by photoconductor 9 and the reflection efficiency of light scattering and reflecting element 10 is high. Accordingly, almost all the light from an incandesent lamp utilized as light emitting element 8 illuminates liquid crystal panel 1. That is, a liquid crystal display device having a backlight with a high efficiency is provided by the invention. Furthermore, the materials of photoconductor 9 and light scattering and reflecting element 10 are readily available at low cost and these materials can be machined readily. With a light emitting element 8 as described above, the light emitting source is small, thin and of low cost but yet it has a long service life.

Figure 2:
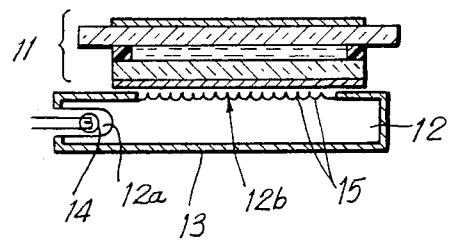
FIG. 2 is a cross-sectional view of a second embodiment of a liquid crystal display device constructed in accordance with the present invention.

Another embodiment of a liquid crystal display device according to the invention can be obtained by modifying the device shown in FIG. 1 as follows. As shown in FIG. 2, the surface 12b of a photoconductor 12 disposed below a liquid crystal panel 11 is made uneven, such as by cutting V-shaped grooves 15 in the surface thereof. A light emitting element 14 is inserted into an opening 12a in photoconductor 12 which is covered by a light scattering and reflecting element 13. Uneven surface 12b specifically the V-shaped grooves 15, can be formed by a mechanical technique using abrasives or by a molding machine. The quantity of light illuminating liquid crystal panel 11 is increased by the formation of uneven surface 12b or V-shaped grooves 15 on photoconductor 12 with the result that the efficiency of illumination is improved. The second embodiment effectively provide a backlight which is soft in addition to the improved efficiency of illumination. Accordingly, the liquid crystal display device of this embodiment of the invention has an excellent backlighting effect.

Figure 3:
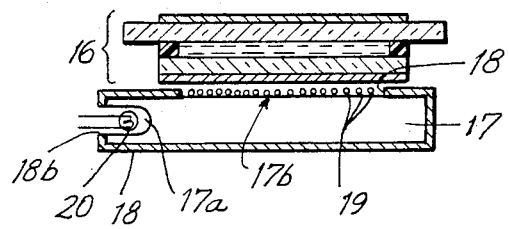
FIG. 3 is a cross-sectional view of a third embodiment of a liquid crystal display device constructed in accordance with the present invention.

FIG. 3 shows a third embodiment of a liquid crystal display device according to the invention in which, instead of the above-described uneven surface 12b or V-shaped grooves 15, plastic or glass beads 19 are arranged on surface 17b of a photoconductor 17 which is disposed behind and adjacent to a liquid crystal panel 16. A light emitting element 20 is inserted into a hole 17a cut in the photoconductor 17. Photoconductor 17 is covered by a light scattering and reflecting element 18, except for an aperture 18b at the power supplying section of a light emitting element 20 and a window 18a through which light is applied to liquid crystal panel 16. Plastic or glass beads 19 are preferably about 5 to 100 $\mu$m in diameter and are commercially available.

In this third embodiment shown in FIG. 3, light from light emitting element 20 enclosed in photoconductor 17 illuminates liquid crystal panel 16 through window 18a. In this operation, the light is irregularly reflected by plastic or glass beads 19 as a result of which the user observes a soft light. Thus, the third embodiment has the effect that the backlight provides excellent eye-appeal in addition to the advantageous effects of the first embodiment shown in FIG. 1. Furthermore, the quantity of light illuminating liquid crystal panel 16 is increased when compared with that in the case where plastic or glass beads 19 are not used. This is another advantage of the third embodiment.

Plastic or glass beads 19 can be disposed on photoconductor 17 using any of a number of available known techniques. Beads 19 can be secured to photoconductor 17 by an adhesive agent or by thermal fusion. Additionally, beads 19 may be embedded in photoconductor 17 while heated to a molten state. Alternatively, beads 19 may be adhered to photoconductor 17 when the latter is molded. As shown in FIG. 3 beads 19 are arranged uniformly. However, the same effect can be obtained by arranging beads 19 randomly or by the formation of two layers of beads 19.

Figure 4:
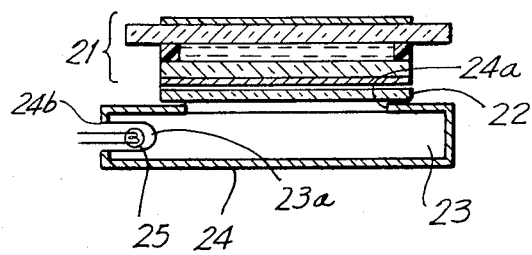
FIG. 4 is a cross-sectional view of a fourth embodiment of a liquid crystal display device constructed in accordance with the present invention.

In a fourth embodiment of the liquid crystal display device of the invention shown in FIG. 4, an opal light scattering plate 22 is disposed between a liquid crystal panel 21 and a photoconductor 23. A light emitting element 25 is disposed in an opening 23a formed in photoconductor 23. Photoconductor 23 is covered by a light scattering and reflecting element 24, except for an opening 24b through which wires pass to light emitting element 25 and a window 24a through which light is applied to liquid crystal panel 21.

Opal light scattering plate 22 may be an opal plastic plate such as an opal acrylic plate, an opal tellurinic plate, an opal film or an opal glass plate all of which are readily available. The same effect is obtained by including opal light scattering plate 22 as when an uneven surface or V-shaped grooves 12b are formed on the photoconductor or plastic or glass beads 19 are arranged on the photoconductor as described above. If opal plate 22 is somewhat thick, the quantity of light illuminating liquid crystal panel 21 will be reduced compared to the construction of FIG. 1. However, it should be noted that employment of opal light scattering plate 22 provides the following effects and advantages. First, the quantity of light can be readily controlled compared with the case where an uneven surface or V-shaped grooves 12b are formed or plastic or glass beads 19 are employed. Second, the light scattering degree is determined by the thickness of opal plate 22 and, accordingly, as long as the plate thickness is uniform, the light scattering degree is uniform throughout the area of the plate. The liquid crystal display device shown in FIG. 4 can be manufactured readily by inserting opal light scattering plate 22 between liquid crystal panel 21 and photoconductor 23.

FIG. 5 shows a fifth embodiment of a liquid crystal display device according to the invention. In this embodiment, an opal light scattering plate 31 is inserted between a liquid crystal panel 26 and a photoconductor 27. A light emitting element 29 is inserted into an opening 27a formed in the photoconductor 27. Photoconductor 27 is covered by a light scattering and reflecting element 28, except for a window 28a on the upper surface 27b of photoconductor 27 which confronts liquid crystal panel 26 through opal light scattering plate 31. Upper surface 27b of photoconductor 27 is made uneven or formed with V-shaped grooves 30. Alternatively, plastic or glass beads may be disposed on upper surface 27b. The quantity of light illuminating liquid crystal panel 26 is increased compared with that in the case wherein upper surface 27b remains even or when V-shaped grooves are not formed therein. If grooves 30 are not uniform, the light is irregularly applied to liquid crystal panel 26. However, this irregularity is substantially corrected by opal light scattering plate 31; and accordingly, liquid crystal plate 26 is illuminated uniformly.

A sixth embodiment of a liquid crystal display device according to the invention is shown in FIG. 6. In the sixth embodiment, a light emitting element 35 is inserted into an opening 33a formed in a photoconductor 33 which is covered by a light scattering and reflecting element 34 with a window 34a formed on the upper surface 33b of photoconductor 33 for illuminating a liquid crystal panel 32. If photoconductor 33 has a uniform thickness, the intensity of light is decreased in inverse proportion to the square of the distance from light source 35 to panel 32. In other words, if photoconductor 33 is uniform in thickness, the intensity of the backlight is higher at positions closer to light source 35 and is lower at positions further from light source 35. Accordingly, parts closer to light source 35 are viewed with a higher contrast and parts further from light source 35 with a lower contrast. In view of this fact, in the sixth embodiment, the thickness of photoconductor 33 is decreased as the distance from an incandescent lamp as light source 35 increases.

With respect to two light beams 36 and 37 which are emitted by light source 35, light beam 36 is scattered by a region 38 of light scattering and reflecting element 34 closer to light source 35 as a result of which light beam 36 thus scattered is converted into a backlight beam 40 illuminating a part of liquid crystal panel 32 closer to light source 35. Light beam 36 is scattered by region 39 of light scattering and reflecting element 34 which is farther from light source 35 as a result of which light beam 37 thus scattered is converted into a backlight beam 41 illuminating a part of liquid crystal panel 32 farther from light source 35. The ratio of the intensity of light scattered by region 38 of light scattering and reflecting element 34 to the intensity of light scattered by region 39 of element 34 corresponds to the ratio of the reciprocal of the square of the distance between light source 35 and region 38 to the reciprocal of the square of the distance between light source 35 and region 39. Accordingly, the light scattering degree of region 38 is greater than that of region 39 by the value of this ratio.

On the other hand, the ratio of the illumination intensity of backlight beam 40 to the illumination intensity of backlight beam 41 corresponds to the ratio of the product of the light scattering degree at light scattering and reflecting element region 38 closer to light source 35 and the reciprocal of the square of the thickness of photoconductor 33 at light scattering and reflecting element region 38 to the product of the light scattering degree at light scattering and reflecting element region 38 farther from light source 35 and the reciprocal of the square of the thickness of photoconductor 33 at light scattering and reflecting element region 39. If the thickness of region 38 is equal to that of region 39, the illumination intensity of backlight beam 40 is higher than that of backlight beam 41. Therefore, in the sixth embodiment, at light scattering and reflecting element region 39 which is farther from light source 35, corresponding to a greater distance from light source 35 than the point of light scattering and reflecting element 34 where light 36 emitted by light source 35 is reflected, photoconductor 33 is made thinner at light scattering and reflecting element region 39 farther from light source 35 so that the intensity of backlight beam 41 farther from light source 35 approaches that of backlight beam 40 closer to light source 35.

In order to accomplish this, the bottom 33' of photoconductor 33 slopes in a straight line from one side of the photoconductor 33 towards the opposite side. As a result, the intensity of backlight beam 41 farther from light source 35 is substantially equal to that of backlight beam 40 closer to light source 35. Accordingly, when liquid crystal panel 32 is illuminated by backlight beams 40 and 41, the brightness and contrast produced are substantially uniform throughout the area of the panel. This construction is suitable for the backlighting of a large liquid crystal panel as well as the backlighting of a small liquid crystal panel.

A seventh embodiment of a liquid crystal display device according to the invention is shown in FIG. 7. In this embodiment, a light emitting element 45 is inserted into an aperture 43a formed in a photoconductor 43 which is covered by a light scattering and reflecting element 44 with a window 44a formed in the upper surface of the photoconductor 43 through which a liquid crystal panel 42 is illuminated. In this embodiment also, the thickness of photoconductor 43 is decreased as the distance from light source 45 increases. However, it should be noted that the bottom 44' of light scattering and reflecting element 44, and accordingly the bottom 43' of photoconductor 43 is curved in such a manner that the thickness of photoconductor 43 is gradually reduced from the side of light emitting element 45 towards the opposite side. The effects of the seventh embodiment are similar to those of the sixth embodiment for providing substantially uniform brightness and contact of backlighting.

Figure 8:
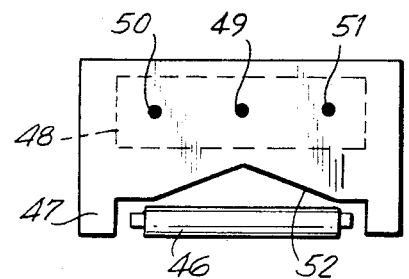
FIG. 8 is a cross-sectional view of an eighth embodiment of a liquid crystal display device including an elongated light source in accordance with the invention.

FIG. 8 illustrates an eighth embodiment of a liquid crystal display device according to the invention. In this embodiment, a linear, elongated or cylindrical light source 46 is employed. A cylindrical incandescent lamp or a cylindrical cold-cathode discharge tube may be used for linear light source 46. In FIG. 8, only a photoconductor 47 and linear light source 46 are shown. A liquid crystal panel is disposed at a position indicated by a dashed line 48.

Linear light source 46 is disposed to apply light to one side of photoconductor 47. Linear light source 46 and photoconductor 47 are covered by a light scattering and reflecting element except for a backlight application window region 48 for the liquid crystal panel and a minimum number of holes through which, for instance, lead wires for supplying current to linear light source 46 pass. In FIG. 8, the liquid crystal panel and the light scattering and reflecting element are not shown.

A specific feature of the eighth embodiment is that photoconductor 47 has a V-shaped recess 52 through which light is applied thereto. If V-shaped recess 52 were not provided, the scattering degree of the light emitted by light source 46 would be highest at the central portion 49 of backlight application window region 48 provided for the liquid crystal panel and would be lower at a right end portion 50 and a left end portion 51. That is, the backlight intensity at central portion 49 would be clearly different from that at right and left end portions 50 and 51. However, the provision of V-shaped recess 52 makes the light scattering degree at central portion 49 substantially equal to that at right and left end portions 50 and 51. This is particularly well-suited for backlighting of a large panel, such as a display in a clock terminal unit and as a display in an automobile. This construction also makes it possible to use effectively a cylindrical incandescent lamp or a cold-cathode discharge tube as linear light source 46. Furthermore, employment of V-shaped recess 52 makes the backlighting intensity uniform over a larger area of photoconductor 47. As a result of this, it is possible to make the area of backlight application window region 48 large compared with the area of photoconductor 47. Thus, a liquid crystal display unit with a backlight of small size and high efficiency is provided according to this embodiment of the invention.

Use of a point light source, such as a small incandescent lamp as the light source is advantageous in that only a small space is required for receiving the light source which contributes to a reduction of the overall size of the liquid crystal display device. However, use of a point light source still suffers from problems in that the liquid crystal panel is not uniformly illuminated by light from the point light source and the illuminating intensity varies at different portions of the liquid crystal panel. This difficulty becomes more significant as the display area of the liquid crystal panel increases. The difficulty may be eliminated by using a plurality of point light sources. Use of a linear light source or a cylindrical light source is advantageous in that the number of components is reduced, the backlight structure is simplified and the reliability is also increased. The troublesome and time-consuming operation of replacing individual point light sources in the case of failure is also eliminated. Furthermore, light emanating from a linear or cylindrical light source is more uniform than that from a point light source, and therefore the former is preferable as the backlight source for a large panel. However, it should be noted that the linear light source does have some drawbacks in that the illumination intensity in the central portion of the liquid crystal panel tends to be higher than that in peripheral portions. In addition, the length of the portion of the tube which emits actual light, that is, the effective light emission tube length, is shorter than the physical length of the tube. Therefore, when illuminating a liquid crystal panel longer than the effective light emission tube length, the illumination intensity of the central portion is often different from that of peripheral portions. Even if the display panel is of equal length to the effective light emission tube length, the backlight section is large compared with the size of the panel.

These shortcomings of the linear light source are overcome in accordance with the eighth embodiment, as described above with reference to FIG. 8. Linear or cylindrical light source 46 is disposed beside photoconductor 47 and V-shaped recess 52 is formed in the side of photoconductor 47 which confronts light source 46. Accordingly, compared with the case where V-shaped recess 52 is not formed, backlight from linear or cylindrical light source 46 diffuses uniformly throughout a larger part of photoconductor 47 covering substantially the entirety of photoconductor 47. In addition, the length of linear or cylindrical light source 46 may be made equal to or less than the width of display region 48 of the liquid crystal panel. Thus, in accordance with the embodiment, a liquid crystal display device with a backlight of small size and high efficiency is provided.

Figure 9:
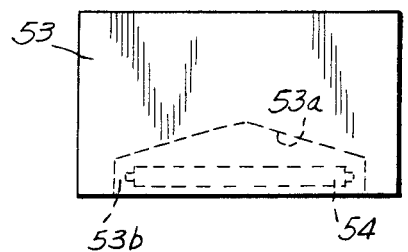
FIG. 9 is a plan view of a backlighted liquid crystal display device including an elongated light source as in FIG. 8 and modified in accordance with the invention.
Figure 11:
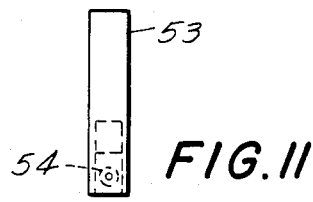
FIG. 11 is a side view of the device of FIGS. 9 and 10.
Figure 10:
FIG. 10 is a front view of the device of FIG. 9.

FIGS. 9, 10 and 11 are a plan view, a front view and a side view, respectively, showing a modification of a backlighted liquid crystal display device in which a V-shaped recess 53a is formed in a photoconductor 53. In these figures, only photoconductor 53 and a linear light source 54 are shown. In this embodiment linear light source 54 is inserted into an opening 53b formed in photoconductor 53. Accordingly, the light from linear light source 54 is somewhat more effectively enclosed in photoconductor 53 than that in the embodiment shown in FIG. 8 thereby further improving the backlighting efficiency.

Figure 12:
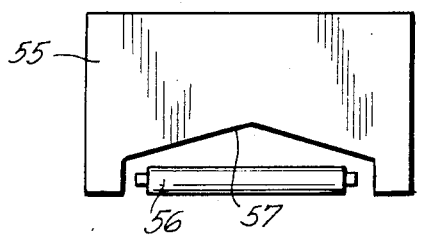
FIG. 12 is a second modification of the device of FIG. 8.

FIG. 12 shows a second modification of the backlighted liquid crystal display device of FIG. 8 in which a linear or cylindrical light source 56 is used. A V-shaped recess 57 formed in a photoconductor 55 has a different configuration from that shown in FIG. 8. However, the effects obtained are substantially the same as that obtained by the device of FIG. 8.

Figure 13:
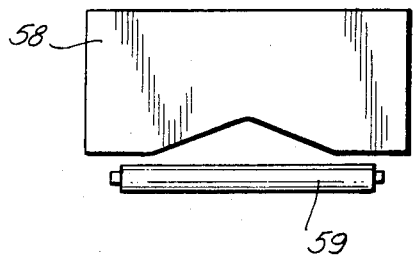
FIG. 13 is a third modification of the device of FIG. 8.

FIG. 13 shows a third modification of the backlighted liquid crystal display device shown in FIG. 8. This device includes a linear light source 59 and a photoconductor 58 as shown in FIG. 13. The effects of this modification are the same as that of the embodiment shown in FIG. 8.

Figure 14:
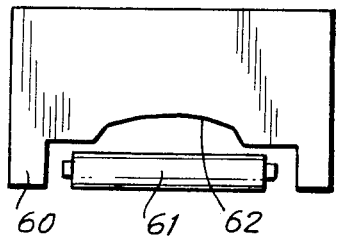
FIG. 14 is a fourth modification of the device of FIG. 8.

FIG. 14 shows a fourth modification of the backlighted liquid crystal display device shown in FIG. 8. Here, a polygonal light receiving recess 62 is formed in a photoconductor 60. In FIG. 14, reference numeral 61 designates a linear light source. The effects are similar to those of the device shown in FIG. 8.

Figure 15:
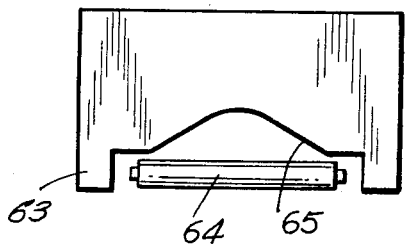
FIG. 15 is a fifth modification of the device of FIG. 8.

FIG. 15 shows a fifth modification of the device shown in FIG. 8. In this embodiment, a light receiving recess 65 is formed by rounding the sharp angle of the V-shaped recess in FIG. 8, that is, light receiving recess 65 has a configuration which is between a "V" and a "U" in shape. In FIG. 15, reference numeral 64 designates a linear light source and reference numeral 63 designates a photoconductor. In the device thus constructed, the light is diffused somewhat more uniformly than in the device of FIG. 8.

Figure 16:
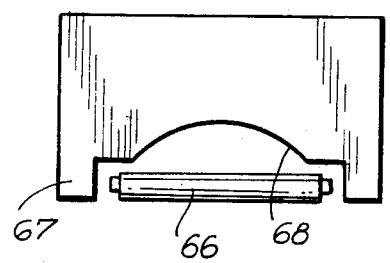
FIG. 16 is a sixth modification of the device of FIG. 8.

FIG. 16 shows a sixth modification of the device shown in FIG. 8. In this embodiment, an elliptical light receiving recess 68 is formed in a photoconductor 67. In FIG. 16, reference 66 designates a linear light source.

The effect of the device in FIG. 16 is similar to that of the device in FIG. 8.

Figure 17:
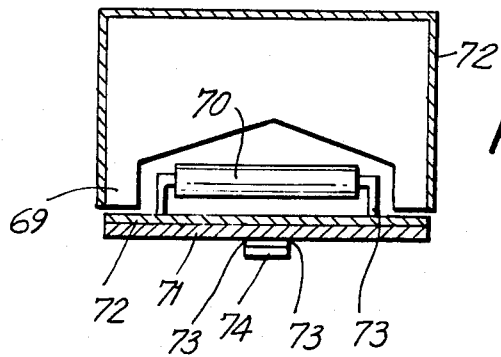
FIG. 17 is a seventh modification of the device of FIG. 8.

FIG. 17 shows a seventh modification of the device in FIG. 8 wherein a cylindrical cold-cathode discharge tube is employed as a linear light source 70 mounted on one side of a substrate 71. A light scattering and reflecting element 72 is disposed on the side of substrate 71. The surface of a photoconductor 69 except a portion thereof confronting the substrate 71 is covered by light scattering and reflecting element 72 with a liquid crystal backlighting window being formed therein.

In order for cold-cathode discharge tube 70 to emit light stably, it is necessary to provide a discharge stabilizing resistor 74 which is disposed on the opposed side of substrate 71 away from tube 70 and is connected to tube 70 by lead wires 73. In this case, as discharge stabilizing resistor 74 is positioned near cold-cathode discharge tube 70, a backlighted liquid crystal display device is provided which has a small size with the discharge carried out stably. Since light scattering and reflecting element 72 is provided between cold-cathode discharge tube 70 and substrate 71, the light is effectively utilized even if substrate 71 is included. Thus, backlighting is provided with high efficiency.

Figure 18:
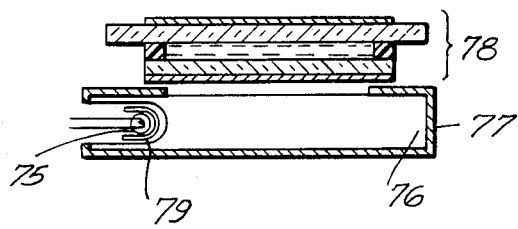
FIG. 18 is a cross-sectional view of a further modification of the device of FIG. 1 including a wavelength selective absorbing filter.

FIG. 18 shows yet another embodiment of a liquid crystal display device according to the invention in which a wavelength selective absorbing filter 79 is disposed between a light emitting element 75 and a liquid crystal panel 78. In FIG. 18, reference numeral 76 designates a photoconductor. The photoconductor 76 and the light emitting element 75 are covered by a light scattering and reflecting element 77. If the light shone on the liquid crystal by light emitting element 75 includes a component such as ultraviolet rays which may harm the liquid crystal and filter 79 can eliminate the harmful component.

It may also be desirable to provide a decorative effect by illuminating liquid crystal display panel 78 with backlight of various colors. This requirement can be satisfied by the employment of filter 79. Light emitting element 75 has a coherent spectral characteristic irrespective of its type. However, the light emitted by the light emitting element can be converted into a backlight of desired color by the use of wavelength selective absorbing filter 79. In this case, it goes without saying that a double-color filter having two portions of different filtering characteristics may be used.

Figure 23:
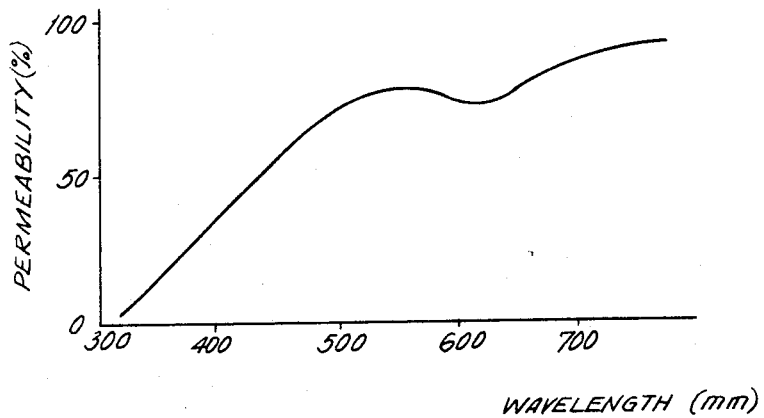
FIG. 23 is a graph showing the spectral characteristic of a liquid crystal material.

FIG. 23 shows an example of the spectral characteristic of a liquid crystal. A variety of liquid crystals are available, although conventionally used liquid crystals have a color ranging roughly from yellow to red. Even a white liquid crystal can have colors in this range.

Figure 22:
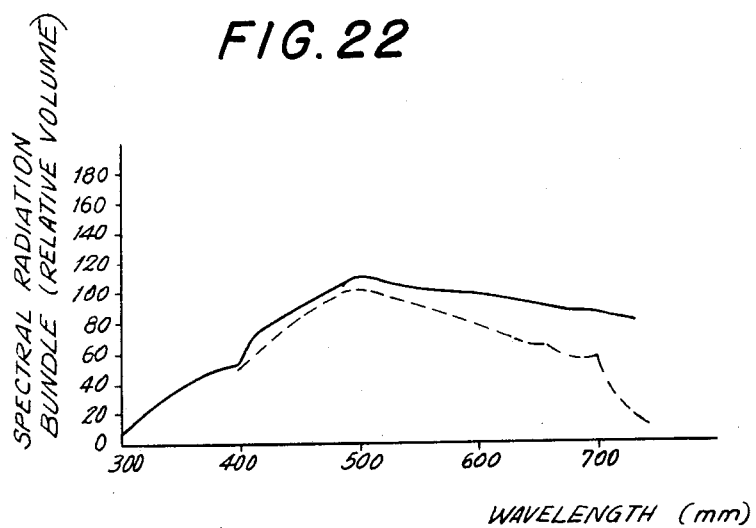
FIG. 22 is a graph of the spectral characteristics of radiant flux of natural day light and a fluorescent light.

FIG. 22 shows the spectral characteristics of the spectral radiant flux of natural daylight by a solid line 94 and fluorescent light by a dash line 95. In the spectral characteristic of the fluorescent light the spectral radiant flux tends to decrease in the visible wavelength band or the long wavelength band compared with natural daylight 94. Therefore, if a cold-cathode discharge tube is employed as backlight emitting element 75 for the liquid crystal panel 78, the reddish color of the liquid crystal in liquid crystal panel 78 matches the spectral characteristics of the cold-cathode discharge tube in which the amount of red is reduced compared with that of natural daylight. Accordingly, when the backlight is turned on, the coloration of liquid crystal panel 78 becomes rich which improves the decorative effect. Thus, the cold-cathode discharge tube can provide an appealing backlight for a colored liquid crystal panel such as a "guest/host" type liquid crystal panel or a TN type liquid crystal panel with a color filter. In this case, the backlight may be somewhat corrected by filter 79 so that its color approaches natural daylight. Filter 79 need be used only when it is necessary to eliminate ultraviolet rays from the light emitted by cold-cathode discharge tube 75, or when it is desired to obtain different backlight colors.

Figure 24:
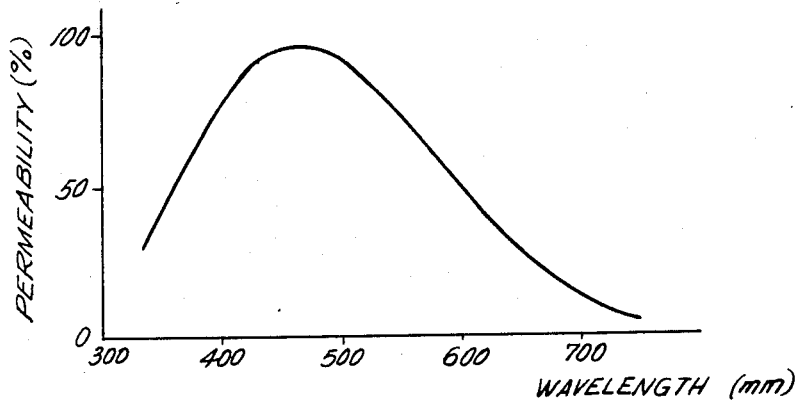
FIG. 24 is a graph showing the spectral characteristic of a blue filter.

The liquid crystal material can be completely protected from harmful ultraviolet rays by using a sharp cut filter which eliminates light waves shorter than about 300 to 400 $\mu$m in wavelength, such as an ultraviolet ray filter. In the case where an incandescent lamp is employed as the light emitting element, the red of the liquid crystal appears more prominent and accordingly the color of the liquid crystal panel is not quite so appealing as the color temperature of the incandescent lamp is about 2000° K. and the radiant light is somewhat reddish. Accordingly, the use of blue filters is preferable in order to improve the appearance of liquid crystal panel 78 under illumination which is close to that of natural daylight 94. FIG. 24 illustrates the spectral characteristic of a blue filter.

A filter having such a spectral characteristic cuts reddish light and is effectively applicable where light emitting element 75 is an incandescent lamp. As the filter converts the spectral characteristic of light emitted from the liquid crystal panel into one closer to the spectral characteristic of natural daylight, the display of liquid crystal panel 78 is very appealing and provides an excellent decorative effect. In such a liquid crystal display device, filter 79 is disposed between liquid crystal panel 78 and light emitting element 75. Accordingly, the display device can be manufactured readily at a low manufacturing cost using an incandescent lamp which is readily available at a low price.

The filter may also be a color temperature conversion filter. The filter may be in the form of a cap, a plastic sheet, a plastic plate or a silicon rubber, polycarbonate or acryl paint which has a filtering effect. The cap is placed about the light emitting element. The paint can be applied directly to the light emitting element by spraying, brush, vacuum-evaporating, or by spinning. A wavelength selective absorbing filter in the form of a cap is advantageous, as it can be detachably placed over the light emitting element and it is low in cost.

In the case where liquid crystal panel 78 is a colored liquid crystal panel such as a "guest/host" type liquid crystal panel or a TN type liquid crystal panel with a double-colored filter, wavelength selective absorbing filter 79 may be inserted between the liquid crystal panel 78 and light emitting element 75 so that light having a spectral characteristic altered to be substantially the same as daylight in the visible wavelength range is applied to liquid crystal panel 78. In this case, the "guest" color or the colors of the double-color filter are not affected; and accordingly, the same appealing colors as those observed under daylight appear. This effect is significant in the case where the spectral characteristic of an incandescent lamp employed as light emitting element 75 is made equal to or similar to the spectral characteristic of daylight or, for instance, in the case where a color temperature conversion filter or a blue filter is employed as optional wavelength selective absorbing filter 79.

Figure 19:
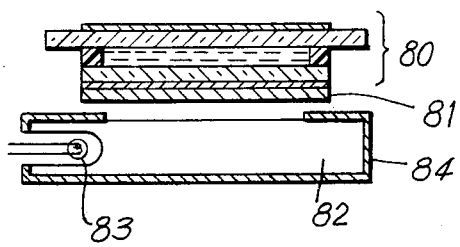
FIG. 19 is a cross-sectional view of the device of FIG. 18 wherein the filter is disposed between the panel and photoconductor.

FIG. 19 shows still another embodiment of a liquid crystal display device according to the invention in which a wavelength selective absorbing filter 81 is inserted between a liquid crystal panel 80 and a photoconductor 82. In FIG. 19, reference numeral 83 designates a light emitting element, and 84 a light scattering and reflecting element. The effects of this embodiment are similar to those of the display device shown in FIG. 18.

Figure 20:
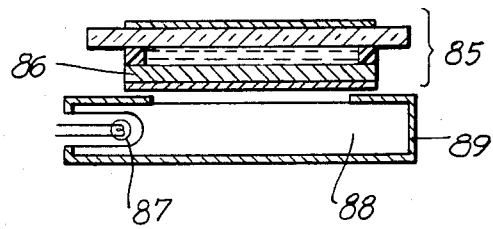
FIG. 20 is a cross-sectional view of the device of FIG. 18 wherein the lower plate includes the filter.

In another embodiment of a liquid crystal display device as shown in FIG. 20, a liquid crystal panel 85 includes a lower glass plate 86 which itself is employed as a filter. The device of FIG. 20, includes a light emitting element 87, a photoconductor 88 and a light scattering and reflecting element 89, arranged as described above. This liquid crystal display device provides the same effects as those of the display device of FIG. 18. The liquid crystal display device of FIG. 20 is advantageous in that, as lower glass plate (or substrate) 86 of liquid crystal panel 85 is made of a material having a filtering effect, the number of manufacturing steps and the number of components necessary are reduced.

Figure 21:
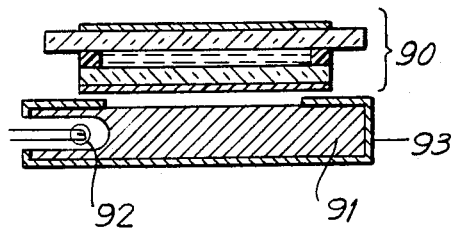
FIG. 21 is a cross-sectional view of the device of FIG. 18 wherein the photoconductor includes the filter.

FIG. 21 shows another embodiment in which a photoconductor 91 has a filtering effect. The device in FIG. 21 includes a light emitting element 92, a light scattering and reflecting element 93 and a liquid crystal panel 90. The effects of this embodiment are the same as those of the embodiment shown in FIG. 18.

In the above-described various embodiments of a liquid crystal display device according to the invention, the light emitting element is shown as being provided only at one position. However, a brighter and more appealing liquid crystal display device can be obtained by providing light emitting elements at two positions or at a number of positions. Additionally, in the above-described embodiments, the opening provided to receive the light emitting element is shown as being formed in the side of the photoconductor. However, the same effect can be obtained by forming the aperture in the upper surface or in the lower surface of the photoconductor.

Circuits for use in operating the liquid crystal display device in accordance with the invention as described above will now be discussed.

Figure 25:
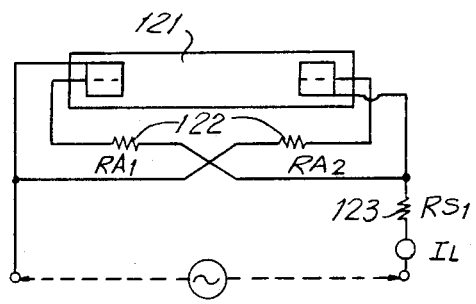
FIG. 25 is a circuit diagram for a circuit for operating a liquid crystal display device of the invention including temperature compensating means.
Figure 26:
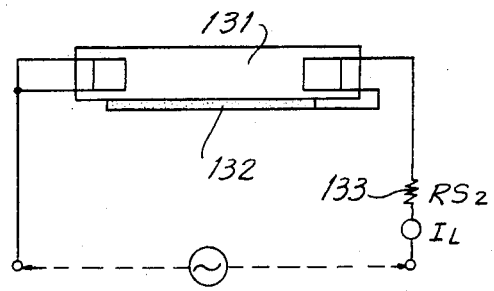
FIG. 26 is another circuit diagram for a circuit for operating a liquid crystal display device of the invention including temperature compensating means.

In FIG. 25, a cold-cathode discharge tube 121 is the light emitting element and a pair of auxiliary resistors (RA$_1$) 122 for stabilizing the discharge operation of cold-cathode discharge tube 121 are coupled to a resistor (RS$_1$) 123 for limiting the tube current I$_L$. In FIG. 26 a cold-cathode discharge tube 131 is coupled to a triggering coating layer 132 for providing a stable discharge operation and is coupled to a tube current limiting resistor (RS$_2$) 133.

In the circuits of FIGS. 25 and 26, a voltage of several hundred volts is applied to the cold-cathode discharge tube and a current limiting resistor (RS$_1$ or RS$_2$) is connected in series with the cold-cathode discharge tube. In a bipolar type arrangement as shown, in general, the discharge starting voltage is several hundred volts. After the discharge has been started, the tube voltage is constant at about 160 V. In the case where the tube is used for illumination, the tube current I$_L$ is, in general from about 5 to 15 mA. If the tube current is increased to 20 to 25 mA or more, the tube will be damaged in a relatively short period of time. The power consumption of the tube itself is, in general, a fraction of one watt. The tube wall temperature is higher by 15° to 20° C. than the ambient temperature.

Figure 27:
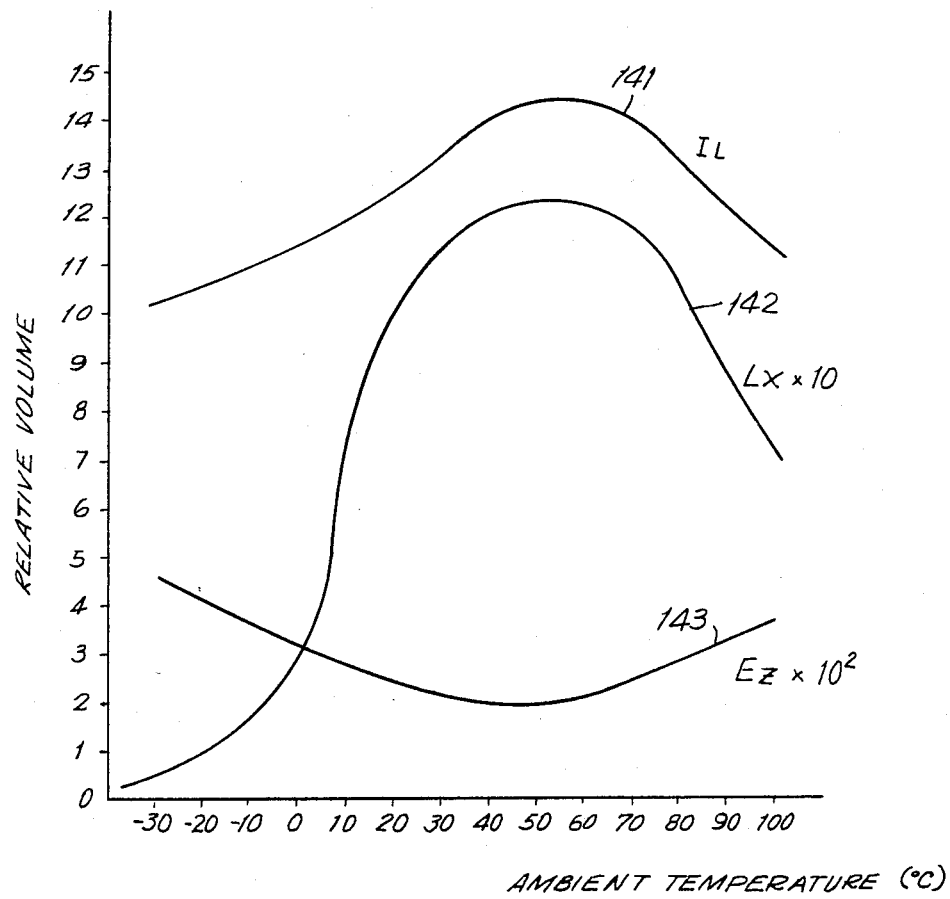
FIG. 27 is a graph of a tube current-temperature characteristic, an illumination intensity-temperature characteristic, and a discharge starting voltage characteristic of a cold-cathode discharge tube.

FIG. 27 is a graphical representation indicating the temperature characteristic of a cold-cathode discharge tube, namely, a tube current temperature characteristic 141, an illumination intensity temperature characteristic 142, and a discharge starting voltage temperature characteristic 143. In FIG. 27, relative values are plotted on the vertical axis. It is apparent from FIG. 27 that the tube current and the illumination have peak values when the ambient temperature is about 50° C. while the discharge starting voltage has a minimum value when the ambient temperature is about 50° C.

Figure 28:
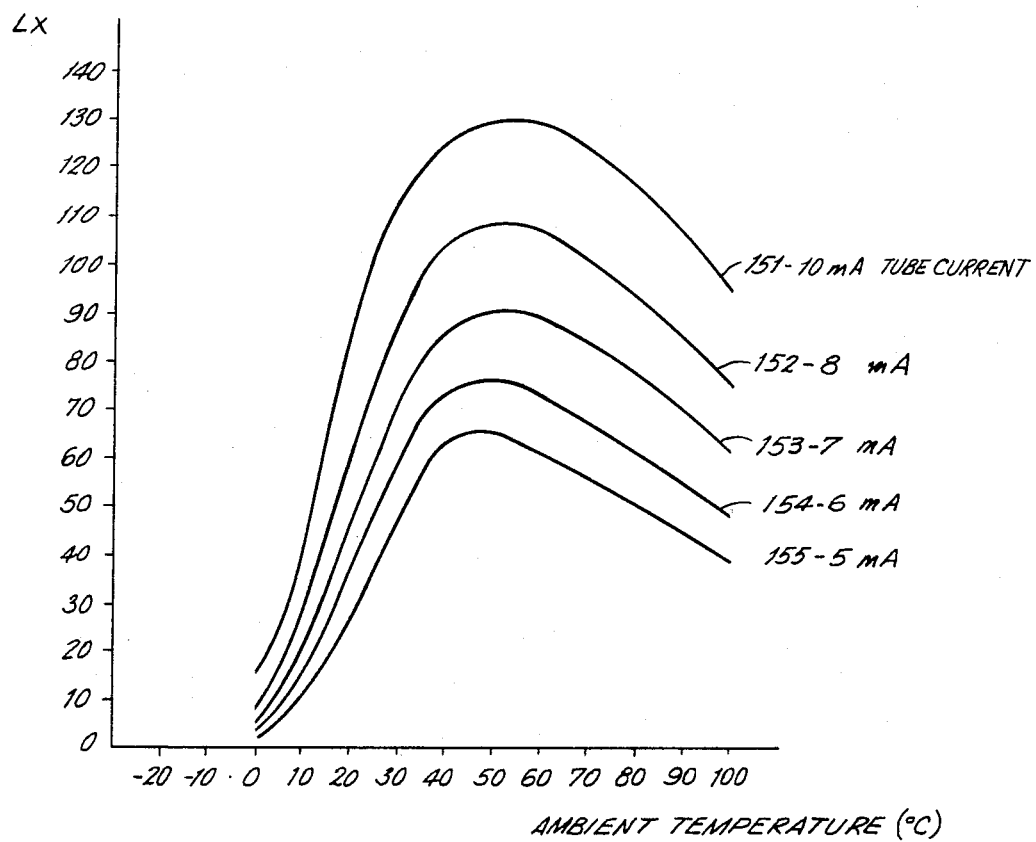
FIG. 28 is a graph showing abient temperature-illumination intensity characteristic curves with tube current as a parameter of a cold-cathode discharge tube.

FIG. 28 shows ambient temperature-illumination intensity characteristic curves with tube currents as parameters, namely, a temperature characteristic curve 151 for a tube current of 10 mA, a temperature characteristic curve 152 for a tube current of 8 mA, a temperature characteristic curve 153 for a tube current of 7 mA, a temperature characteristic curve 154 for a tube current of 6 mA, and a temperature characteristic curve 155 for a tube current of 5 mA. It is clear from FIG. 28 that the illumination intensity has a maximum value when the ambient temperature is about 50° C. irrespective of the tube current. If the ambient temperature is constant, as the tube current increases, the illumination intensity increases.

FIGS. 29 and 30 are circuit diagrams showing first and second embodiments of a circuit of the invention in which a first positive characteristic thermistor (RS$_1$') 161 and a second positive characteristic thermistor (RS$_2$') 171 are connected in series with cold-cathode discharge tubes 162 and 172, respectively. In FIGS. 29 and 30, reference numerals 164 and 174 designate stabilizing resistors (RS$_1$ and RS$_2$), 165 auxiliary resistors (RA$_1$) and 175 a triggering coating layer. As in the arrangement shown in FIG. 25 including tube current limiting resistor 123, thermistors 161 and 171 are disposed on the tube wall or near the tube. In FIG. 29, auxiliary resistors provided for maintaining a stable discharge operation are located in a tube region 163 designated by a dashed line. In FIG. 30, triggering coating layer 175 is provided in a tube region 173 designated by a dashed line. The circuit of FIG. 29 is the same as that of FIG. 30 except for the structure of tube regions 163 and 173. FIGS. 29 and 30 can be redrawn as shown in FIG. 31 in which a tube region 183 designated by a dashed line corresponds to tube regions 163 and 173, respectively, of FIGS. 29 and 30. In FIG. 31, a thermistor (RS$_3$') 181 is coupled in series with a tube current limiting resistor (RS$_3$) 184. Thermistor 181 may be coupled in parallel with resistor 184 or resistor 184 may be omitted altogether.

As is apparent from discharge starting voltage temperature characteristic curve 143 in FIG. 27, the discharge starting voltage has a minimum value when the ambient temperataure is about 50° C. That is, when the ambient temperature is higher or lower than about 50° C., the discharge starting voltage increases. In general, the ambient temperature (atmospheric temperature or room temperature) can be expected to range from about 0° C. to about 40° C. If the ambient temperature falls below about 0° C., it is necessary to increase the discharge starting voltage. If, in this connection, thermistor 181 in the circuit in FIG. 31, which may be disposed near the light source 8 in FIG. 1 as shown by a reference numeral 101, has a characteristic that its resistance is low at low temperature but is high at a high temperature of about 50° C., then a sufficiently high discharge starting voltage can be obtained even at low temperature. A cold-cathode discharge tube suffers from the problem that starting and maintaining the discharge is difficult at low temperatures, although this problem can be overcome by coupling a thermistor to the tube.

When the ambient temperature is low, for instance at 0° C. and the discharge of the cold-cathode discharge tube is started, a high voltage is applied in view of the presence of thermistor 101. Conversely, a low voltage is applied to the tube when the ambient temperature is high, for instance at 50° C. Accordingly, the tube current is high at low ambient temperatures and less at high ambient temperatures. As is apparent from the illumination temperature characteristic curves with the parameter of tube current shown in FIG. 28, the illumination intensity is high when the tube current is low. Accordingly, upon starting the discharge at low ambient temperatures, the illumination intensity produced is substantially equal to that when the ambient temperaturee is high. Similarly, when the ambient temperature is high, the illumination intensity is substantially equal to that when the ambient temperature is low.

When starting the discharge when the ambient temperature is low, the tube temperature increases due to the discharge after a certain warm-up time. It is clear from FIG. 28 that if the tube current is constant, the illumination intensity reaches a peak value when the ambient temperature is about 50° C. However, with a constant ambient temperature, the illumination intensity will increase with an increasing tube current. Accordingly, the illumination intensity immediately after the start of discharge is equal to the illumination intensity provided after the warm-up time after the start of discharge. On the other hand, because of the presence of thermistor 101, a large tube current flows when the tube ambient temperature is low, whereas a small tube current flows when the tube ambient temperature is high. Accordingly, at a high temperature, the minimum illumination intensity at that temperature is provided, while at a low temperature, the maximum illumination at that temperature is provided. Thus, during the warm-up time which elapses from the start of discharge until the tube ambient temperature has reached a stable value, the illumination intensity is relatively constant.

After the warm-up time has elapsed after the start of discharge, both the tube current and the illumination intensity become constant. This can be explained with reference to FIG. 28 described above. As the temperature increases, the resistance of the thermistor 101 increases as the tube current decreases. In contrast, as the temperature decreases, the resistance of the thermistor 101 decreases while the tube current increases. Accordingly, the amount of heat generated by the cold-cathode discharge tube is increased and therefore the ambient temperature is increased. Thus, the tube current, the illumination intensity and the tube ambient temperature become constant at a predetermined period of time after the start of discharge. If the cold-cathode discharge tube is maintained lighted, the discharge tube's illumination intensity is maintained unchanged without being affected by the ambient temperature which is an excellent effect. The tube current is maintained unchanged irrespective of ambient temperature variations and current overloads are avoided. This results in an extended service life of the cold-cathode discharge tube.

Referring again to FIG. 1, the acrylic resin or polycarbonate resin forming the photoconductor 9 can soften and deform at temperatures of about 100° C. This drawback can be eliminated by the employment of thermistor 101 wherein the temperature of the cold-cathode discharge tube wall and its ambient temperature are not excessively increased and are maintained within acceptable limits by the action of thermistor 101. By maintaining the temperature of the tube wall and its ambient temperature at substantially constant values as described above, the temperature of liquid crystal panel 1 is also maintained substantially unchanged. Accordingly, the display rate of liquid crystal panel 1 is maintained without any effect thereon by changes in the ambient temperature with the result that not only can the user observe the display with ease, but also the liquid crystal display device can be easily designed and constructed.

As the temperature of a liquid crystal panel is maintained unchanged as described above, for instance in a multiplex application, a margin of 20° to 30° C. instead of 0° to 40° C. may be employed for the temperature characteristic conditions of liquid crystal panel 1. A result of this is that a simple temperature compensation circuit can be employed or the temperature compensation circuit can be omitted. Furthermore, as unwanted conditions such as temperature shock which can affect liquid crystal panel 1 are avoided, the various materials forming liquid crystal panel 1, such as liquid crystal material 7, the sealing agents, polarizing plates 4 and 5 and an adhesive for bonding the polarizing plates are maintained satisfactory. That is, deterioration is avoided, and there is little if any peeling with the net result that the service life of the display panel is increased.

As is apparent from the above description, the invention provides the following significant effects:

1. A cold-cathode discharge tube employed as the backlight source has a long service life and can be continuously operated. As a cold-cathode discharge tube emits white light, the display produced by the panel is pleasing. Moreover, a cold-cathode discharge tube can easily be used with color filters to provide a color display, such as with the use of a colored polarizing plate or in a transmission type "guest/host" display.

2. The photoconductor can be made of plastic material, such as acrylic resin or polycarbonate resin, and can be readily manufactured on a large scale.

3. Including a thermistor provides a temperature regulating effect. This provides a tube current limiting effect, constant illumination intensity, a photoconductor protecting effect and a liquid crystal panel protecting effect.

These favorable results are also true for the embodiments other than that illustrated in FIG. 1.

Figure 32:
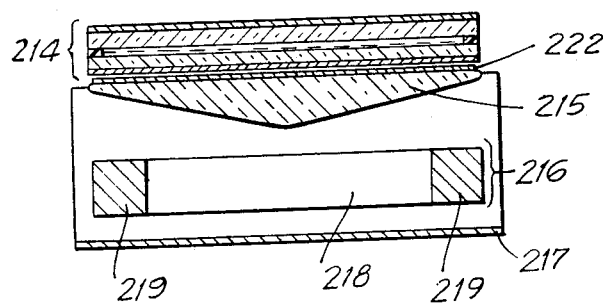
FIG. 32 is a sectional front view of a further embodiment of a liquid crystal display device of the invention.
Figure 33:
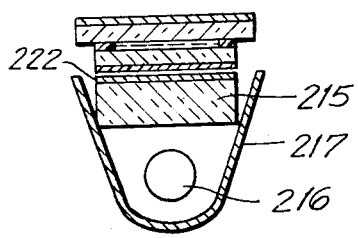
FIG. 33 is a sectional side view of the device of FIG. 32.

In order to improve the display further, the scattering and reflecting plate, such as plate 10 in FIG. 1 should be designed so that the light emitted by the light source is uniformly distributed over the liquid crystal without increase of the thickness of the device. FIG. 32 is a sectional front view of another embodiment according to the present invention and FIG. 33 is a sectional side view thereof. In FIGS. 32 and 33, a light scattering and reflecting element 217 is provided which can be a plate of Al, Fe or stainless steel or it can be a plate prepared by plating, vacuum-evaporating or sputtering Al, Fe or Ag on a base metal plate. Alternatively, plate 217 can be manufactured according to one of the following methods.

According to a first one of the methods, a transparent plastic photoconductor of polycarbonate resin or acrylic resin is formed on the inside of the metal plate adapted to reflect light, while on the outside of the metal plate, a metal foil or a laminated sheet of aluminum and plastic is provided by bonding, mechanical mounting or mechanical pressure. In a second method, a metal such as Al, Ni or Ag is vacuum-evaporated or sputtered onto a photoconductor. According to a third method, a metal such as Al, Ni or Ag mixed in an adhesive or paint is coated onto a photoconductor.

In another embodiment, the thickness of an opal light scattering element 215 is such that, in a direction parallel to a linear light source 216, the central portion is thicker and the two end portions are thinner. With opal light scattering element 215 shaped as described above, its central portion is closer to the central portion 218 of linear light source 216 which is higher in intensity and accordingly the central portion is subjected to high intensity light. On the other hand, the two end portions of opal light scattering element 215 are closer to the ends 219 of linear light source 216 which emit no light or emit light of low intensity and are more remote from central portion 218 of linear light source 216 so that the two end portions of element 215 are illuminated with a low intensity light. However, the central portion of opal light scattering element 215 is thicker as described above, and accordingly the light, being scattered, is transmitted to the end portions while the light intensity at the central portion is somewhat decreased. On the other hand, the two end portions of opal light scattering element 215 are thinner as described above, and accordingly light can satisfactorily pass through the two end portions. Furthermore, the light scattered at the central portion is transmitted to the two end portions of element 215. Thus, the light intensity, due to the scattering effect, is increased at the two end portions of element 215. As a result, the illumination intensity in the central portion of opal light scattering element 215 is substantially equal to that at the two end portions of element 215. In other words, the light scattering intensity is uniform throughout element 215. Accordingly, the liquid crystal display device according to this embodiment of the invention provides uniform illumination. Therefore, even if the liquid crystal display device is operated for a relatively long time or is operated continuously, the user will observe a constant and uniform intensity. As the distance between liquid crystal panel 214 and light source 216 is short, these advantages may be obtained merely by modifying the configuration of opal light scattering element 215 as described. Therefore, a liquid crystal display device having a uniform illumination intensity effect can be readily reduced in thickness and accordingly in overall size.

In FIGS. 32 and 33, a semi-transparent reflecting element 222 can be disposed between liquid crystal panel 214 and opal light scattering element 215, if desired. In the daytime when light source 216 need not be turned on, semi-transparent reflecting element 222 causes the backlight to scatter and allows a portion of the light to pass therethrough. Therefore, when there is a great deal of ambient light around the display device, light source 216 is turned off without using the backlight, and only when it is dark around the display device is the light source turned on to minimize the power consumption of the backlight. Semi-transparent reflecting element 222 itself has a light scattering effect. Therefore, the use of semi-transparent reflecting element 222 placed over opal light scattering element 215 contributes further to obtaining uniform light intensity. If the illumination of the backlight is excessively high, the intensity of light illuminating liquid crystal panel 214 can be reduced to a suitable value by inserting semi-transparent refelecting element 222.

Figure 34:
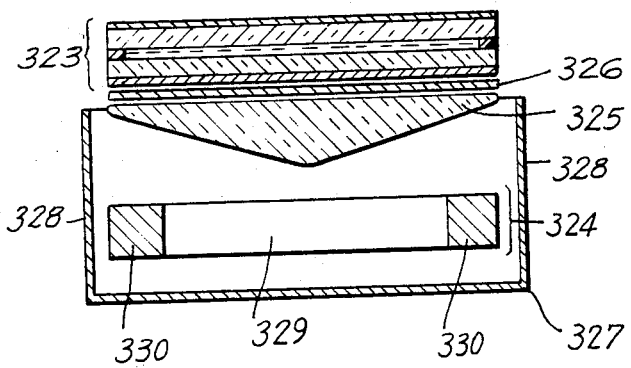
FIG. 34 is a sectional front view of a still further embodiment of a liquid crystal display device of the invention.
Figure 35:
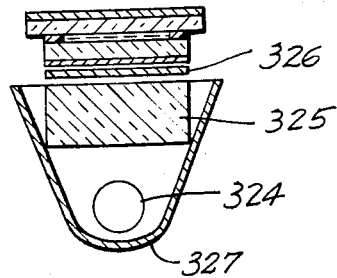
FIG. 35 is a side view of the device of FIG. 34.

FIGS. 34 and 35 are, respectively, a sectional front view and a sectional side view of another embodiment of the invention. A liquid crystal panel 323, a linear light source 324 and an opal light scattering element 325 are shown. These components are similar in construction to those of the embodiment of the invention described with reference to FIGS. 32 and 33. Further in FIGS. 34 and 35, a semi-transparent reflecting element 326 can be inserted, if desired as in the earlier embodiment. A light scattering and reflecting element 327 having light scattering and reflecting side elements 328 is provided at both ends of linear light source 324. Semi-transparent reflecting element 326 which can be inserted between liquid crystal panel 323 and opal light scattering element 325 are shown as in the embodiment described with reference to FIGS. 32 and 33. A linear light source 324 has a light emitting portion 329 and two end portions 330 which emit no light or emit light at a low intensity which are hereinafter referred to as a "non-emitting portion", when applicable. This embodiment differs from the embodiment of FIGS. 32 and 33 in that light scattering and reflecting side elements 328 extend perpendicularly to linear light source 324 at both ends of liquid crystal panel 323. As light scattering and reflecting side elements 328 are provided on both sides of the display device as described above, light is scattered by the two light scattering and reflecting side elements although linear light source 324 has non-emitting portions at both ends. That is, the same illuminating effect as in the case where the linear light source has light emitting portions at both ends is obtained. Accordingly, the light intensity produced is uniform and opal light scattering element 325 can be easily manufactured. In addition, the thickness of the central portion of the opal light scattering element 325 can be reduced and the backlight portion of the device can be made thinner. Thus, according to this embodiment of the invention, a small liquid crystal display device with an illuminating unit can be provided. The loss of light is decreased by the provision of light scattering and reflecting element side 328 on two sides which contributes to an improvement of the efficiency of the device.

Figure 36:
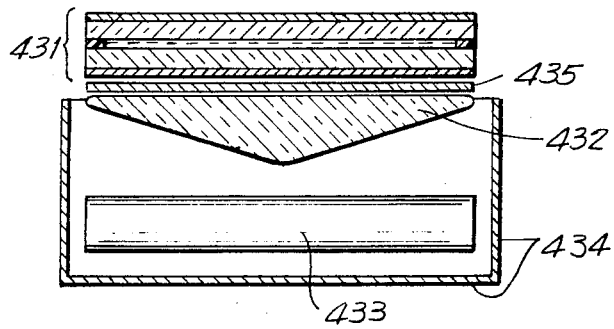
FIG. 36 is a sectional front view of still another embodiment of a liquid crystal display device of the invention.
Figure 37:
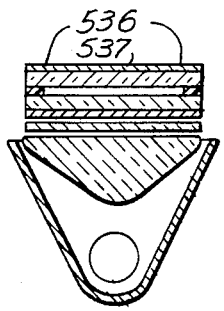
FIG. 37 is a sectional side view of the device of FIG. 36.

In FIGS. 36 and 37, a sectional front view and a sectional side view showing still another embodiment of the invention are shown. A liquid crystal panel 431, a linear light source 433, a light scattering and reflecting element 434, an opal light scattering element 432 and a semi-transparent reflecting element 435 which can be inserted between liquid crystal panel 431 and opal light scattering element 432 if desired are arranged as in the embodiments of FIGS. 32–35. This embodiment, however, differs from the those embodiments in the configuration of opal ilght scattering element 432. This will be described with reference to FIGS. 38 and 39 in detail which are a front view and a side view of opal light scattering element 432 shoiwn in FIGS. 36 and 37, respectively.

Figure 38:
FIG. 38 is a sectional view of an example of an opal light scattering element used in several embodiments of a liquid crystal display device of the invention.
Figure 39:
FIG. 39 is another sectional side view of the element of FIG. 38.

In this embodiment of the invention, the configuration of opal light scattering element 432 is such that, as shown in FIGS. 38 and 39, in a direction parallel to the longitudinal direction of linear light source 433, the central portion is thicker and the end portions are thinner. In a direction perpendicular to linear light source 433, the central portion is thicker and the two end portions are thinner. If the diameter of the light emitting portion of linear light source 433 is small compared with the width of the gaps at the two ends of liquid crystal panel 431, irregular illumination is caused in a direction perpendicular to the longitudinal direction of linear light source 433 in the gap of liquid crystal panel 431.

Figure 40:
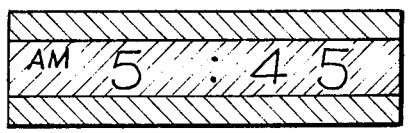
FIG. 40 is a front view of an example of a displayed pattern produced by a liquid crystal display device.

This effect is more apparent from FIG. 40. As shown in FIG. 40, the upper and lower portions of the displayed pattern "AM 5:45" have dark regions 536 while a middle portion 537 is brighter. Such irregular illumination may be eliminated by increasing the distance between linear light source 433 and liquid crystal panel 431, although it is impossible to eliminate completely the irregular illumination in this manner. In addition, if the distance is increased, the size of the liquid crystal display device is increased also. However, this problem may be overcome in accordance with this embodiment. Opal light scattering element 432 is so shaped that, in a direction perpendicular to the longitudinal direction of linear light source 433, the central portion closer to the light source is thicker and the end portions farther from the light source are thinner. Accordingly, a liquid crystal display device which is free from this irregular illumination and having an excellent illumination effect is provided by this embodiment of the invention.

It will thus be seen that the objects set forth above, and those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A liquid crystal display device comprising:
   a liquid crystal panel having a length and a width;
   an elongated light source means for illuminating said liquid crystal display panel;
   a light passage member of one of a transparent and a translucent material, said light passage member being disposed between said liquid crystal panel and said light source means and formed with a recess in the light inlet surface facing said light source means, said light passage member being substantially as wide as said liquid crystal panel, said recess being adapted to provide backlighting of uniform intensity, said recess and said elongated light source means being substantially as long as said light passage member and said liquid crystal panel are wide;
   and a light reflection member substantially surrounding said light reflecting member having an opening facing said liquid crystal display panel to expose a surface portion of said light passage member.

2. The liquid crystal display device of claim 1, wherein said exposed surface portion of said light passage member is formed with a plurality of recesses for scattering light passing therethrough.

3. The liquid crystal display device of claim 1, further including a plurality of beads of one of plastic and glass disposed on said exposed surface portion of said light passage member for scattering light passing therethrough.

4. The liquid crystal display device of claim 1, wherein said light passage member is a transparent plastic resin.

5. The liquid crystal display device of claim 1, wherein said light source means comprises an elongated light source and wherein said light passage member is formed with a space in the light inlet side, said linear light source disposed in said space.

6. The liquid crystal display device of claim 1, wherein said light scattering member is selected from the group of milky colored polycarbonate resins and milky colored acrylic resins.

7. The liquid crystal display device of claim 1, wherein said light source means comprises a cold-cathode discharge tube and said device further includes a wavelength selection filter disposed between a liquid crystal layer of said liquid crystal panel and said light source.

8. The liquid crystal display device of claim 7, including a base plate, said cold-cathode discharge tube mounted to a first side of the base plate facing said light passage member, said light scattering and reflecting member being mounted between said base plate and said discharge tube, and further comprising discharge stabilizing resistor means mounted on the side of said base plate opposite said first side.

9. The liquid crystal display device of claim 1, wherein the shape of a section of the recess is a flat polygon.

10. The liquid crystal display device of claim 1, wherein the shape of a section of the recess is elliptical.

11. The liquid crystal display device of claim 1, wherein the shape of a section of the recess is substantially semi-circular.

* * * * *